United States Patent [19]

Krezak et al.

[11] Patent Number: 4,470,199

[45] Date of Patent: Sep. 11, 1984

[54] METHOD AND APPARATUS FOR ALIGNING AIRCRAFT INSTRUMENTS BEARING PLATFORMS

[75] Inventors: John E. Krezak, Bellevue; Stephen J. Lebel, Renton, both of Wash.

[73] Assignee: The Boeing Company, Seattle, Wash.

[21] Appl. No.: 469,459

[22] Filed: Feb. 24, 1983

[51] Int. Cl.³ .............................................. G01C 9/06
[52] U.S. Cl. ........................................ 33/366; 33/382; 33/180 R
[58] Field of Search ................ 33/180 R, 343, 366, 33/381, 382

[56] References Cited

U.S. PATENT DOCUMENTS

| | | | |
|---|---|---|---|
| 703,306 | 6/1902 | Roe | 33/381 |
| 944,810 | 12/1909 | McPhetridge | 33/395 |
| 2,111,673 | 3/1938 | Mozonchak | 33/215 |
| 2,113,062 | 4/1938 | Soltesz | 33/215 |
| 2,427,902 | 9/1947 | Clifton et al. | 33/366 |
| 2,926,842 | 3/1960 | Ackerman | 235/61 |
| 2,964,266 | 12/1960 | Fuchs | 244/14 |
| 3,414,899 | 12/1968 | Buell | 343/9 |
| 3,435,533 | 4/1969 | Whitfield | 33/382 |
| 3,492,465 | 1/1970 | Buscher et al. | 235/150.25 |
| 3,537,307 | 11/1970 | Pliha | 73/178 R |
| 3,603,000 | 9/1971 | Ostrager | 33/382 |
| 3,782,167 | 1/1974 | Stuelpnagel | 73/1 E |
| 3,790,766 | 2/1974 | Brown | 235/150.25 |
| 3,816,935 | 6/1974 | Wilmot | 33/180 R |
| 3,896,885 | 7/1975 | Dahlstrom et al. | 173/2 |
| 3,939,571 | 2/1976 | Studdard | 33/180 R |
| 4,085,440 | 3/1978 | Hose | 364/454 |
| 4,218,827 | 8/1980 | Huvers | 33/318 |
| 4,274,494 | 6/1981 | Bergstrom | 173/2 |
| 4,284,987 | 8/1981 | Gibson et al. | 340/689 |
| 4,288,056 | 9/1981 | Bergstrom | 248/542 |
| 4,394,799 | 7/1983 | Moree et al. | 33/343 |

FOREIGN PATENT DOCUMENTS 8099 of 1911 United Kingdom .................. 33/366

*Primary Examiner*—Richard R. Stearns
*Attorney, Agent, or Firm*—Christensen, O'Connor, Johnson & Kindness

[57] ABSTRACT

A two plane assembly (100) having a first, substantially horizontal plane (140), and a second plane (160) at a compound angle with respect to the first plane, is mounted to a reference surface (112), established by optical or other suitable means. An inclinometer pair (146, 148; 170, 172) is affixed to each plane, with each inclinometer of a pair disposed orthogonally with respect to the other. The values from the inclinometers are recorded and the assembly is then mounted to a platform to be aligned. The pitch, roll and azimuth of the platform is adjusted such that the output from each inclinometer agrees with its recorded value, thereby accomplishing platform alignment.

9 Claims, 3 Drawing Figures

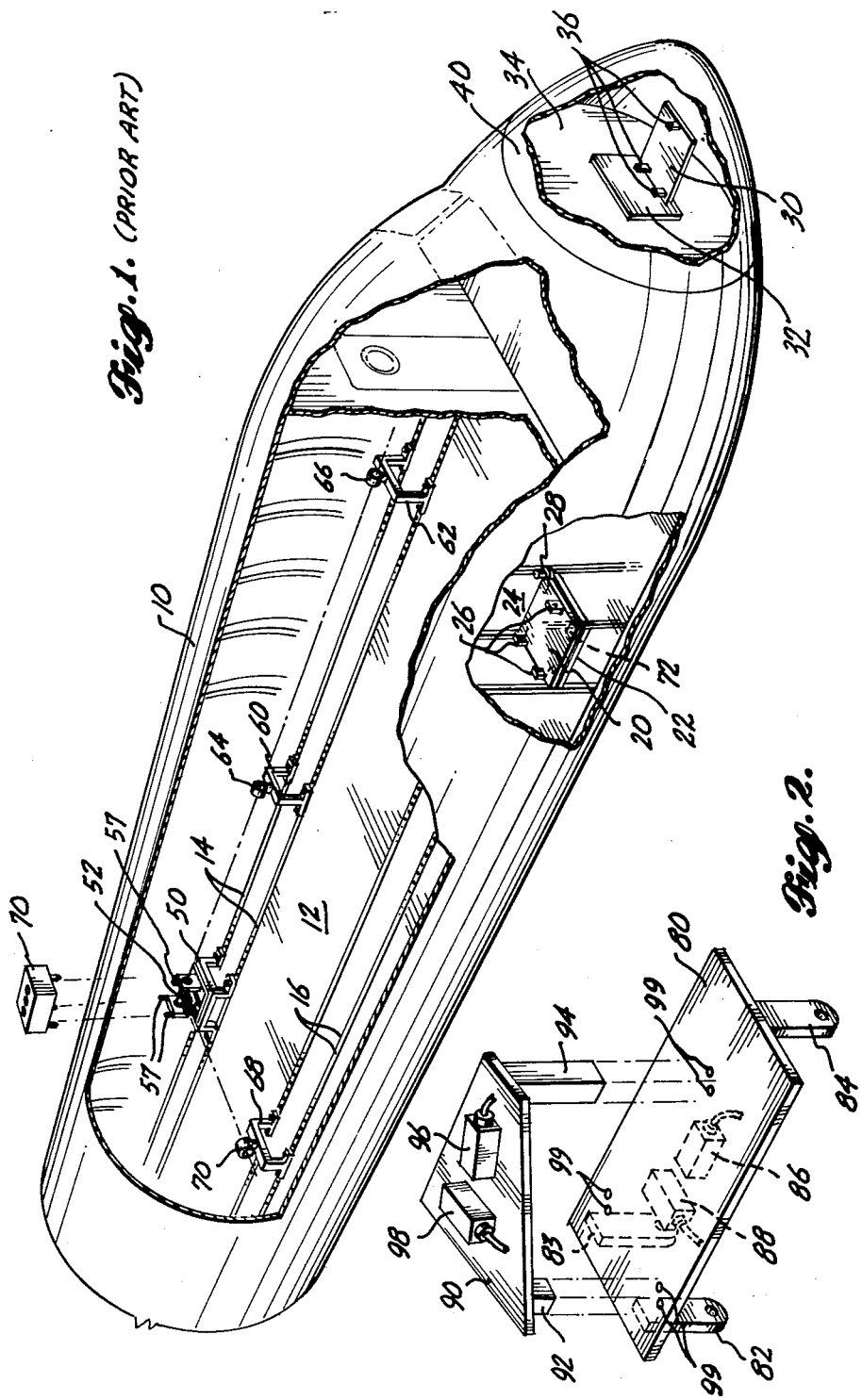

METHOD AND APPARATUS FOR ALIGNING AIRCRAFT INSTRUMENTS BEARING PLATFORMS

BACKGROUND OF THE INVENTION

The present invention pertains to the art of aligning one or more surfaces with respect to a reference surface and, in particular, to a method and apparatus for aligning the instrument bearing platforms of an aircraft with respect to the axes of the aircraft.

There is a need in the commercial aircraft art to align various instrument bearing platforms, or trays, positioned at various locations within the aircraft with respect to the aircraft's axes. Without such alignment, the indications from these instruments, such as guidance related systems, might prove erroneous.

FIG. 1 is a cutaway view of an aircraft's fuselage 10. Shown is the floor 12 of the aircraft in which are formed seat track pairs 14, 16. In the present example, the aircraft body structure is fabricated to tooling which indexes to the seat tracks 14, 16. Thus, the plane defined by the seat tracks 14, 16 is inherently a plane of zero roll, pitch and azimuth with respect to the axes of the aircraft.

An instrument platform 20 mounts to brackets 22 within an equipment housing 24 accessed through the fuselage 10. In this instance, platform 20 supports, via alignment brackets 26, the inertial reference equipment (not shown) of the aircraft's navigation equipment. It is imperative for proper operation of the inertial reference equipment that the platform 20 be aligned with respect to the three axes of the aircraft. It should be noted that the platform 20 is capable of rotating about a stud 28, the axis of which is perpendicular to the azimuth plane of platform 20.

An equipment tray 30 is supported by a bracket 32 which mounts to the bulkhead 34 of the aircraft. In the present instance, tray 30 supports, via alignment brackets 36, the aircraft's weather radar equipment. As with platform 20, it is imperative that tray 30 be aligned with respect to the pitch, roll and azimuth axis of the aircraft to assure proper output readings from the weather radar equipment. Tray 36 is accessible by raising the radome 40 of the aircraft.

The prior art approach to indexing the target platforms 20, 30 with respect to the three aircraft axes is understood as follows.

An alignment tray tool 50 is affixed to a seat track pair, such as pair 14. Affixed to tool 50 is telescope 52 and alignment tray brackets 54, both of which are seen more clearly with respect to FIG. 3.

A pair of longitudinal sight targets 60, 62 are positioned at spaced intervals towards the forward portion of the aircraft and are affixed to the first seat track pair 14. A cross hair (not shown) is provided within the sight portions 64, 66 of the sights 60, 62.

In addition, a sight target 68, also having a cross hair provided within a sight 70, is mounted opposite tool 50 and affixed to the second seat track pair 16.

An operator, viewing through the telescope 52, aligns cross hairs provided in his telescope with the cross hairs of the sight targets 60, 62 and 68. Suitable adjusting means (more clearly shown with respect to FIG. 3) provided on the alignment tray tool 50 allows the operator to adjust the pitch, roll and azimuth of this tool. In this way, by aligning the telescope with the target sights, the operator establishes that the telescope and, thus, the mounting surface of the alignment tray tool 50 are in a plane parallel with the axes of the aircraft.

At this point, a gyroscopic reference system 70 is mounted to the aligning brackets 54 of the alignment tray tool 50. After a stabilization period, null sensing galvanometers are set to "zero" reference for the gyroscopic reference system of pitch, roll and azimuth. The gyroscopic reference system 70 is then physically removed from the alignment tray tool 50 and carted to the location of the inertial reference platform 20. It is then mounted to the aligning brackets 26 of platform 20 and given time to stabilize. After the stabilization period, the pitch and roll of platform 20 are adjusted by peelable shins, such as shims 72, provided under each corner of the platform until the indicated pitch and roll readings from the gyroscopic reference unit 70 agree with the null readings taken on the alignment tray tool 50. After pitch and roll are adjusted, the platform 20 is rotated about the stud 28 until the azimuth reading of the gyroscopic reference unit 70 agrees with the null reading taken on the alignment tray tool 50. In this manner, platform 20 is aligned with respect to the axes of the aircraft.

Finally, the gyroscopic reference unit 70 is removed from platform 20 and carted to the vicinity of tray 30. There it is mounted to tray 30 via the alignment brackets 36, and the pitch, roll and azimuth of tray 30 are adjusted in the same manner as was used to adjust platform 20.

The aforedescribed technique for aligning the aircraft instrument bearing platforms suffers from numerous problems, most of which relate to the gyroscopic reference unit. This unit is extremely expensive and very fragile. It is not uncommon for the unit to suffer impact while it is being moved between mounting positions. This impact may cause errors in the equipment, whereby the procedure must be reinstituted or may result in possible damage to the unit itself.

In addition, the gyroscopic units require a lengthy time to stabilize, both during "spin up" and "spin down" whereby the aforedescribed platform aligning technique is extremely time consuming.

SUMMARY OF THE INVENTION

There is a long felt need in this art, therefore, for a method and apparatus of aligning target surfaces with respect to a reference surface, which method and apparatus does not suffer from the aforedescribed problems.

Briefly, according to the invention, apparatus for aligning a target surface, adjustable in pitch, roll and azimuth with respect to a reference surface, includes a first plane means having locking means for locking the first plane to the target surface or the reference surface. A first pair of inclinometers is mounted at a predetermined angle with respect to each other to the first plane. A second plane mounts to the first plane at a predetermined compound angle with respect thereto. A second pair of inclinometers is mounted at a predetermined angle with respect to each other to the second plane.

A method for adjusting the pitch, roll and azimuth of a target surface such that it is in predetermined alignment with respect to a reference surface includes the steps of:

(a) mounting a two plane assembly to the reference surface, the two plane assembly being comprised of:
(i) a first planar surface;

(ii) a first pair of inclinometers mounted at a predetermined angle with respect to each other to the first planar surface;

(iii) a second planar surface mounted to the first planar surface at a predetermined compound angle with respect thereto;

(iv) a second pair of inclinometers mounted at a predetermined angle with respect to each other to the second planar surface;

(b) recording the output of each of the inclinometers;

(c) removing the two plane assembly from the reference surface;

(d) mounting the two plane assembly to the target surface; and, (e) adjusting the pitch, roll and azimuth of the target surface such that the output from each inclinometer bears a predetermined relationship to its recorded value.

BRIEF DESCRIPTION OF THE DRAWINGS

FIG. 1 is a cutaway view of the fuselage of an aircraft illustrating the prior art means for aligning a reference surface and two target surfaces;

FIG. 2 is an exploded, assembly view of the two plane assembly having orthogonally mounted servo inclinometers thereon; and, FIG. 3 is a detailed perspective view of the alignment tray tool including telescopic bench and two plane assembly mounted to the seat tracks of an aircraft.

DETAILED DESCRIPTION OF THE PREFERRED EMBODIMENT OF THE INVENTION

Figure 3:
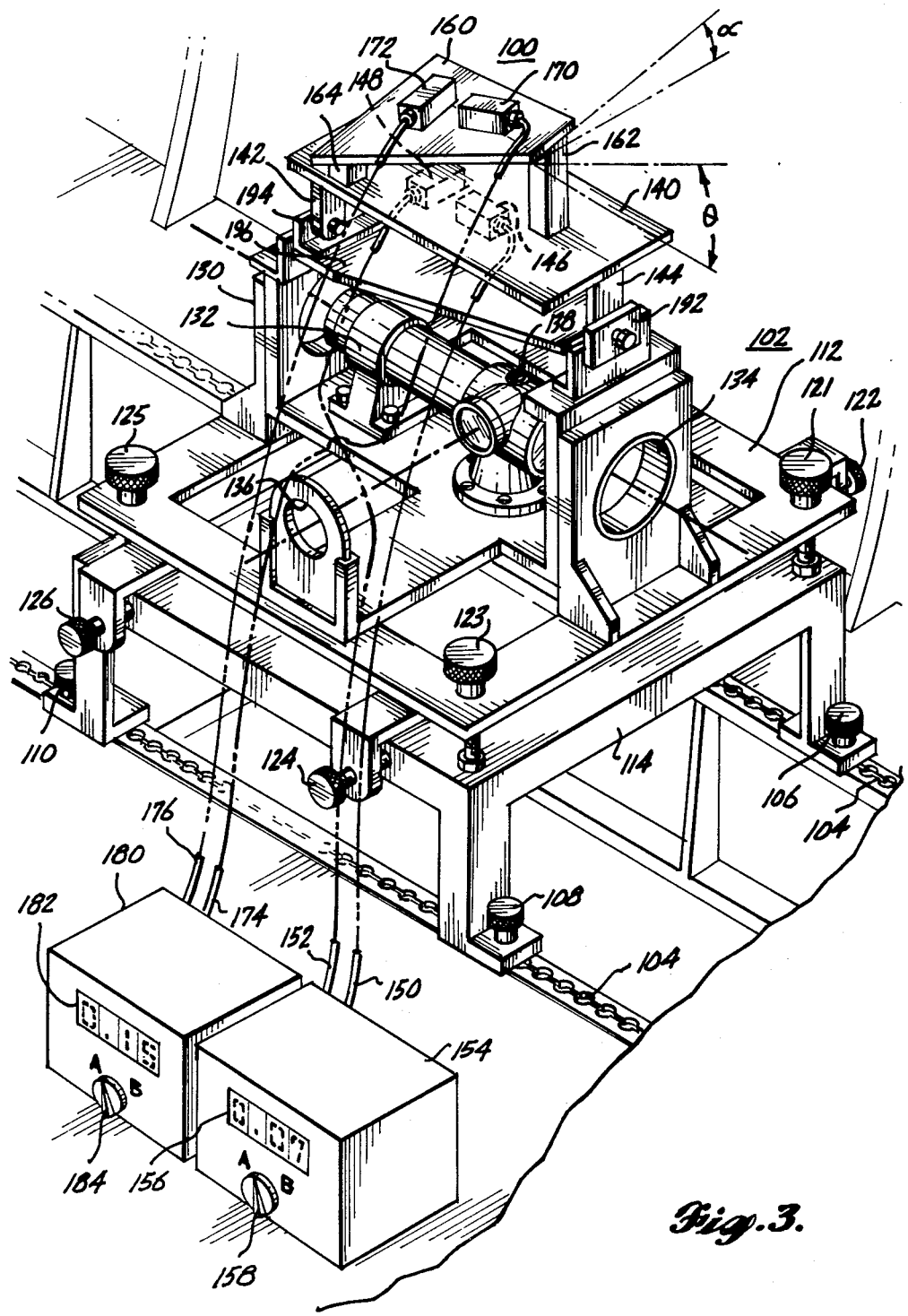

In the present invention, the gyroscopic reference system 70 as described above with respect to FIG. 1 is replaced by a two plane assembly, as shown in exploded view in FIG. 2. Here, a lower plane member 80 has three projecting brackets, 82, 83 and 84. The brackets have provided mounting holes which provide a means to mount the assembly to the aligning brackets of the reference and target surfaces shown in FIG. 1.

Mounted to the underside surface of plane member 80 are a pair of servo inclinometers 86, 88. Inclinometers 86, 88 are positioned orthogonally, one with respect to the other. In the known manner, the inclinometers 86, 88 produce output electrical signals related to the angle to which each inclinometer is inclined with respect to horizontal. In this, the preferred embodiment of the invention, inclinometers 86, 88 produce a zero output signal at 0° inclination and a maximum output signal at 90° inclination.

A second plane member 90 has three pedestals extending downwardly therefrom, two of which, 92, 94, are visible. The pedestals 92, 94 provide a means to mount the second plane member 90 to the first plane member 80, via mounting holes 99 provided therein. The pedestals are of a length such that the second plane member 90 is tilted at a compound angle, of pitch $\theta$ and roll $\alpha$ (FIG. 3) with respect to the first plane member 80.

Mounted to the upper surface of plane member 90 are a second pair of inclinometers 96, 98. As with the first pair, the second inclinometer pair 96, 98 are positioned orthogonally, one with respect to the other. In this, the preferred embodiment of the invention, the inclinometers 96, 98 are designed to produce a zero output signal at zero inclination and a maximum output signal at 3° inclination.

The inclinometers 86, 88, 96, and 98 are commercially available from Schaevitz Engineering, Pennsauken, N.J.

FIG. 3 illustrates the two plane assembly 100 mounted to an alignment tray tool, indicated generally at 102. Alignment tray tool 102 is identical to that shown in FIG. 1. Here, tool 102 is secured to a seat track pair 104 via mounting means, such as screws 106, 108, 110 and a fourth screw (not shown). A platform 112 is supported on the frame 114 of tool 102 via a series of adjusting means, such as adjusting screws 121-126. The adjusting screws provide a means to vary the pitch, roll and azimuth of tray 112 with respect to frame 114.

A telescopic bench, indicated generally at 130, mounts to the platform 112. The telescopic bench 130 is comprised of a telescope 132 which is sightable through a longitudinal aperture 134 or a transverse aperture 136 as determined by the position of a line of sight controlling lever 138.

In the manner described with respect to FIG. 1, an operator views through telescope 132 and aperture 134 to a pair of target sights mounted on seat track pair 104 at spaced intervals towards the forward portion of the fuselage. By setting lever 138 to its alternate position, the operator may similarly view through aperture 136 to a target sight positioned at right angles to telescope 132 and mounted to a separate set of seat tracks. The operator aligns cross hairs in the telescope 132 with transparent optical targets provided on the target assembly by suitably adjusting the adjusting means including screws 121-126. In this manner, platform 112 becomes aligned with the seat tracks and, thus, the three axes of the aircraft.

At this point, the two plane assembly 100 is mounted to the alignment tool tray 102. Assembly 100 includes a lower plane member 140 having three downwardly extending mounting legs, two of which are shown at 142, 144. Mounted to the undersurface of first plane member 140 are a pair of inclinometers 146, 148. Inclinometers 146, 148 are positioned orthogonally, one with respect to the other. The electrical signals produced by the inclinometers 146, 148 are routed via electrical leads 150, 152 to a readout instrument 154. Readout instrument 154 acts in the normal manner to process signals from the inclinometers 146, 148 and provide a digital readout of the angle of incline of each inclinometer 146, 148 as selected by switch 158.

A second plane member 160 mounts to the first plane member 140 via a series of three feet, two of which are shown at 162, 164. The length of these feet are selected such that the second plane member 160 is pitched at an angle $\theta$, and rolled at an angle $\alpha$ with respect to the first plane member 140. In one embodiment of the invention, both $\theta$ and $\alpha$ were selected at 0.5°, whereby the angles indicated in FIG. 3 are exaggerated for the purpose of illustration.

Mounted to the upper surface of second plane member 160 are a pair of inclinometers 170, 172. Inclinometers 170, 172 are mounted orthogonally, one with respect to the other. The electrical signals produced by inclinometers 170, 172 are routed via electrical leads 174, 176, respectively, to a second readout instrument 180. Readout instrument 180, acting in a manner similar to instrument 154, provides a digital display 182 of the angle of incline of either the first inclinometer 170 or the second inclinometer 172 as selected by switch 184.

The two plane assembly 100 attaches to the alignment tray tool 102 via a series of three mounting brackets, two of which, 192, 194, are shown in FIG. 3. The mounting brackets extend from an alignment tray 196 which mounts to the telescopic bench 130. Once the two plane assembly 100 is in position on the alignment tray tool 102, the readings from each of the inclinometers 146, 148 and 174, 176 are recorded via instruments 154, 180. Thereafter, the two-plane assembly 100 is removed from the alignment tray tool 102 and carted to one of the target tray platforms. For example, referring to FIG. 1, the two plane assembly may then be mounted to the inertial reference platform 20 via mounting bracket 26. Now, the pitch and roll of the platform 20 is adjusted, as via suitable shims, until the readings from the inclinometers 146, 148 on the first plane member 140 agree with those readings taken on the alignment tray tool. Then, platform 20 is rotated in its azimuth plane about stud 28 until the readings from inclinometers 170, 172 agree with the readings from these inclinometers as taken on the alignment tray tool. Once platform 20 is positioned such that the outputs from all four inclinometers agree with their previously recorded values, alignment of platform 20 with the reference tray 112 of alignment tray tool 102 is assured.

The two plane assembly may thereafter be removed from platform 20 and affixed to other aircraft target platforms to be aligned, such as the weather radar tray 30. This tray may be aligned in the same manner as tray 20.

It should be noted that proper alignment of the azimuth axis of each platform requires that the first plane member be offset in both pitch and roll from the horizontal plane. This is accomplished in the preferred embodiment of the invention by assuring that the aircraft's reference plane, i.e., the plane defined by the seat tracks, is minimally 0.1° inclined in both pitch and roll with respect to a pure horizontal plane.

It will be understood that the two plane assembly as described above, including the two inclinometer pairs, totally replaces the gyroscopic reference system used in the prior art. The two plane assembly has proven extremely accurate and durable in use, and is considerably less expensive than its gyroscopic reference system counterpart. In addition, inasmuch as the inclinometers require very little time to stabilize, platform alignment can be accomplished according to the apparatus and method of the present invention in considerably less time than with the use of a gyroscopic reference system.

In summary, an improved method of, and apparatus for aligning target surfaces with respect to a reference surface have been described.

While a preferred embodiment of the invention has been described in detail, it should be apparent that many modifications and variations thereto are possible, all of which fall within the true spirit and scope of the invention.

The embodiments of the invention in which a property or privilege is claimed are as follows:

1. Apparatus for aligning a target surface, adjustable in pitch, roll and azimuth, with respect to a reference surface, comprising:
    a first plane means including locking means for selectively locking said first plane means to the target surface or the reference surface;
    a first pair of inclinometers mounted at a predetermined angle with respect to each other to said first plane means;
    a second plane means mounted to said first plane means at a predetermined compound angle with respect thereto; and,
    a second pair of inclinometers mounted at a predetermined angle with respect to each other to said second plane means.

2. The apparatus of claim 1 wherein said first plane means is substantially within, having a predetermined minimum offset from, a horizontal plane when mounted to either the target or the reference surface; and
    wherein said second plane means mounts to said first plane means at a predetermined pitch angle $\theta$ and at a predetermined roll angle $\alpha$ with respect thereto.

3. The apparatus of claim 1 wherein:
    said first pair of inclinometers are mounted at a 90° angle therebetween; and,
    said second pair of inclinometers are mounted at a 90° angle therebetween.

4. A method for adjusting the pitch, roll and azimuth of a target surface such that it is in predetermined alignment with respect to a reference surface, the method comprising the steps of:
    (a) mounting a two plane assembly to the reference surface, the two plane assembly being comprised of:
        (i) a first planar surface;
        (ii) a first pair of inclinometers mounted at a predetermined angle with respect to each other to the first planar surface;
        (iii) a second planar surface mounted to the first planar surface at a predetermined compound angle with respect thereto;
        (iv) a second pair of inclinometers mounted at a predetermined angle with respect to each other to the second planar surface;
    (b) recording the output of each of the inclinometers;
    (c) removing the two plane assembly from the reference surface;
    (d) mounting the two plane assembly to the target surface; and,
    (e) adjusting the pitch, roll and azimuth of the target surface such that the output from each inclinometer bears a predetermined relationship to its recorded value.

5. The method of claim 4 wherein step (e) comprises the further steps of:
    (i) adjusting the pitch and roll of the target surface such that the output from each of the first inclinometer pair is within a predetermined limit of the recorded values for said first pair; and,
    (ii) rotating the target surface about an axis perpendicular to the azimuth plane thereof such that the output from the second inclinometer pair is within a predetermined limit of the recorded values for said second pair.

6. The method of claim 5 wherein the first planar surface when mounted on the reference surface is disposed in a substantially horizontal plane with a predetermined minimum offset with respect thereto, and wherein the second planar surface is disposed at a predetermined pitch angle $\theta$ and at a predetermined roll angle $\alpha$ with respect to the first planar surface.

7. The method of claim 4 wherein the first planar surface when mounted on the reference surface is disposed in a substantially horizontal plane with a predetermined minimum offset with respect thereto, and wherein the second planar surface is disposed at a predetermined pitch angle θ and at a predetermined roll angle α with respect to the first planar surface.

8. Apparatus for aligning one or more instrument bearing platforms of a craft with respect to the axes of said craft, comprising:
  means for aligning the pitch, roll and azimuth of a reference surface with respect to the axes of the craft;
  a two plane assembly having:
    a first plane substantially within, but at a minimum predetermined offset angle with respect to, a horizontal plane;
    a first pair of inclinometers mounted orthogonally with respect to each other on said first plane;
    a second plane fixed with respect to the first plane at a pitch angle θ and a roll angle α with respect thereto; and,
    a second pair of inclinometers mounted orthogonally with respect to each other on said second plane;
  means for predeterminedly affixing the two plane assembly to either the reference surface or one of the instrument bearing platforms;
  means for recording the output from each inclinometer when the two plane assembly is affixed to the reference surface; and
  means operable when the two plane assembly is affixed to one of the instrument bearing platforms for:
    adjusting the pitch and roll angles of the platform such that the output from each of the first inclinometer pair is within a predetermined limit from the recorded values of said pair; and
    rotating the platform about an axis perpendicular to the azimuth plane thereof such that the output from each of the second inclinometer pair is within a predetermined limit from the recorded values of said pair.

9. A method for aligning one or more instrument bearing platforms of a craft with respect to the axes of said craft, comprising the steps of:
  (a) predeterminedly aligning the pitch, roll and azimuth of a reference surface with respect to the axes of the craft;
  (b) providing a two plane assembly having:
    (i) a first planar surface;
    (ii) a first pair of inclinometers mounted orthogonally with respect to each other on said first planar surface;
    (iii) a second planar surface being fixed with respect to the first planar surface and inclined at a pitch angle θ and a roll angle α will respect thereto; and
    (iv) a second pair of inclinometers mounted orthogonally with respect to each other on said second planar surface;
  (c) affixing the two plane assembly to the reference surface such that said first planar surface is substantially within, but at a minimum predetermined offset angle with respect to, a horizontal plane;
  (d) recording the output from each inclinometer;
  (e) affixing the two plane assembly to the instrument bearing platform to be aligned;
  (f) adjusting the pitch and roll of said platform such that the output from each first inclinometer pair is within a predetermined limit of the recorded values for said pair; and,
  (g) rotating the platform about an axis perpendicular to the azimuth plane thereof such that the output from each second inclinometer pair is within a predetermined limit of the recorded value for said pair.

* * * * *